(12) United States Patent  (10) Patent No.: US 7,860,308 B2
Shah  (45) Date of Patent: Dec. 28, 2010

(54) APPROACH FOR NEAR DUPLICATE IMAGE DETECTION

(75) Inventor: Shesha Shah, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1078 days.

(21) Appl. No.: 11/506,330

(22) Filed: Aug. 17, 2006

(65) Prior Publication Data

US 2007/0127813 A1 Jun. 7, 2007

(30) Foreign Application Priority Data

Dec. 1, 2005 (IN) .................. 3233/DEL/2005

(51) Int. Cl.
*G06K 9/00* (2006.01)
*G06K 9/46* (2006.01)
*G06K 9/68* (2006.01)

(52) U.S. Cl. ...................... 382/170; 382/190

(58) Field of Classification Search .......... 382/128, 382/132, 162, 164, 165, 167, 168, 170, 173, 382/190, 218–220, 253, 254, 276, 277; 358/515, 358/518, 520, 522, 530; 345/589, 600–604
See application file for complete search history.

(56) References Cited

U.S. PATENT DOCUMENTS

| | | | | |
|---|---|---|---|---|
| 5,872,867 A | * | 2/1999 | Bergen | 382/254 |
| 6,018,590 A | * | 1/2000 | Gaborski | 382/168 |
| 6,118,892 A | * | 9/2000 | Williams | 382/132 |
| 7,058,220 B2 | * | 6/2006 | Obrador | 382/168 |
| 7,062,084 B2 | * | 6/2006 | Messing et al. | 382/165 |
| 7,454,058 B2 | * | 11/2008 | Porikli | 382/168 |
| 2003/0059110 A1 | * | 3/2003 | Wilt | 382/168 |
| 2006/0110033 A1 | * | 5/2006 | Toshihiro | 382/162 |
| 2006/0182323 A1 | * | 8/2006 | Kollias et al. | 382/128 |
| 2007/0127813 A1 | * | 6/2007 | Shah | 382/170 |

* cited by examiner

*Primary Examiner*—Amir Alavi
(74) *Attorney, Agent, or Firm*—Hickman Palermo Truong & Becker LLP; Edward A. Becker (57) ABSTRACT

A content-based approach is provided for detecting near duplicate images. The approach generally involves analyzing the content of images to be compared and generating color and texture histogram descriptor data for each image. The images may then be compared based upon the color and texture histogram descriptor data to determine whether the images are near duplicate images. Content-based image signature data may also be generated for each of the images based upon the color and texture histogram descriptor data. The image signature data may then be compared to determine whether the corresponding images are near duplicate images.

36 Claims, 5 Drawing Sheets

FIG. 1

102 — DETERMINE CENTER OF MASS OF EACH IMAGE AND DEFINE SEGMENTS

104 — GENERATE COLOR HISTOGRAM DESCRIPTOR DATA

106 — GENERATE TEXTURE HISTOGRAM DESCRIPTOR DATA

108 — GENERATE IMAGE SIGNATURE DATA

110 — DETERMINE WHETHER IMAGES ARE NEAR DUPLICATE IMAGES

APPROACH FOR NEAR DUPLICATE IMAGE DETECTION

CROSS-REFERENCE TO RELATED APPLICATION

This application is related to and claims the benefit of priority from Indian Patent Application No. 3233/DEL/2005 filed in India on Dec. 1, 2005, entitled APPROACH FOR NEAR DUPLICATE IMAGE DETECTION, the entire content of which is incorporated by this reference for all purposes as if fully disclosed herein.

FIELD OF THE INVENTION

The present invention relates to detecting near duplicate images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Near duplicate images are images that are visually identical to the human eye but that do not have identical data representations. Various data processing techniques, such as scaling, down sampling, clipping, rotating and color processing can generate near duplicate images. For example, an original image may be copied and the copy modified by performing color processing on the copy. The modified copy of the image may appear visually identical to the original image, but have a different data representation because of the color processing applied to the copy.

Various issues have arisen relating to near duplicate images on the Internet. In the context of Internet searching, it is not uncommon for the results of a search to include near duplicate images. One reason for this is that most search engines identify matching images based upon keyword matching. That is, keywords contained in a search query are compared to keywords associated with images. An image having an associated keyword that matches a keyword contained in a query is determined to be a match for that query and is included in the search results. When an image is copied and the copy modified to create a near duplicate image, the near duplicate image may have the same associated keywords as the original image. In this situation, both the original image and the modified near duplicate image are included in the search results. From the prospective of both the search engine host and end users, it is desirable to not include near duplicate images in search results.

Although approaches exist and have been employed to detect duplicate images, using these approaches to detect near duplicate images has proven to be ineffective. One such approach involves comparing pixel information at fixed locations. While this approach may be useful in detecting exact duplicate images, it has significant limitations when used to detect near duplicate images. For example, the approach is effective when a copy of an image is cropped and the pixels being compared are not in the portion that has been cropped. In this situation, the comparison of pixel information would correctly identify the images as near duplicate images. On the other hand, this approach is not useful when the changes include slight changes in color, scaling or rotation. When a copy of an image is modified in this manner, a comparison of pixel information would indicate that the original image and the modified copy are not near duplicate images. In a search engine application, this would result in both the original and modified copy being included in search results as different images, even though the modified copy is a near duplicate of the original image because it appears visually identical to the original image.

Based upon the foregoing, an approach for detecting near duplicate images that does not suffer from limitations of prior approaches is highly desirable.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein. Various embodiments of the approach are described hereinafter in the following sections:

I. OVERVIEW
II. CENTER OF MASS AND IMAGE SEGMENTS
III. COLOR HISTOGRAM DESCRIPTOR DATA
IV. TEXTURE HISTOGRAM DESCRIPTOR DATA
V. IMAGE SIGNATURE DATA GENERATION
VI. DETERMINING WHETHER IMAGES ARE NEAR DUPLICATE IMAGES
VII. IMPLEMENTATION MECHANISMS

I. Overview

A content-based approach is provided for detecting near duplicate images. The approach generally involves analyzing the content of images to be compared and generating color and texture histogram descriptor data for each image. The images may then be compared based upon the color and texture histogram descriptor data to determine whether the images are near duplicate images. Content-based image signature data may also be generated for each of the images based upon the color and texture histogram descriptor data.

The image signature data may then be compared to determine whether the corresponding images are near duplicate images.

Figure 1:
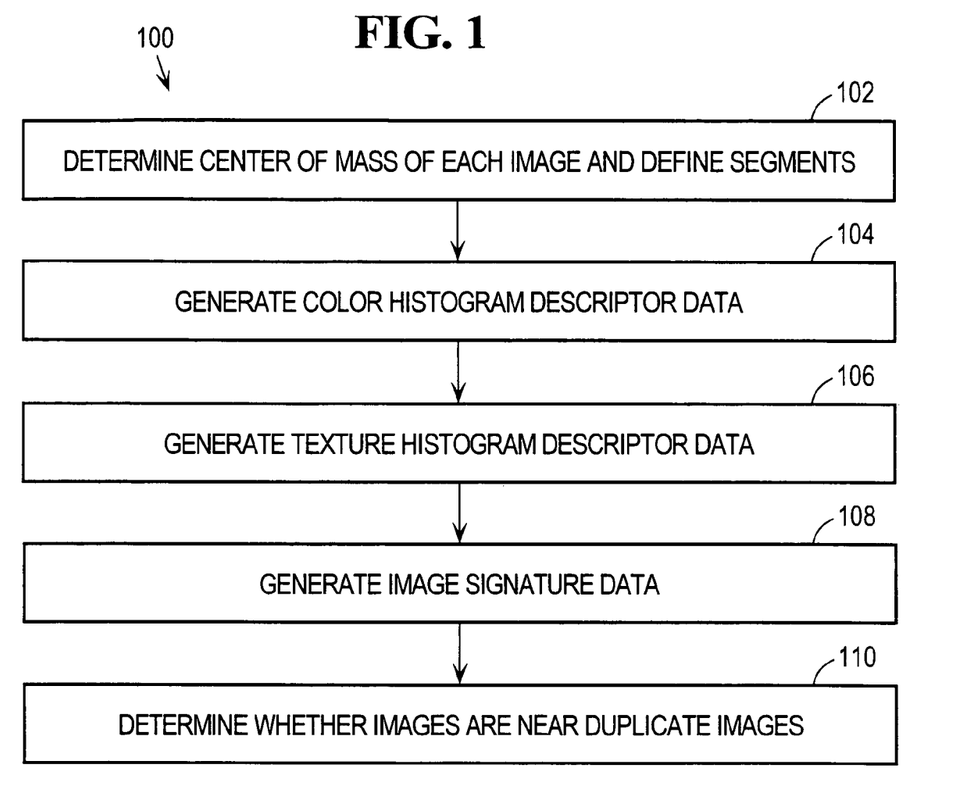
FIG. 1 is a flow diagram that depicts an approach for detecting near duplicate images according to one embodiment of the invention.
Figure 4:
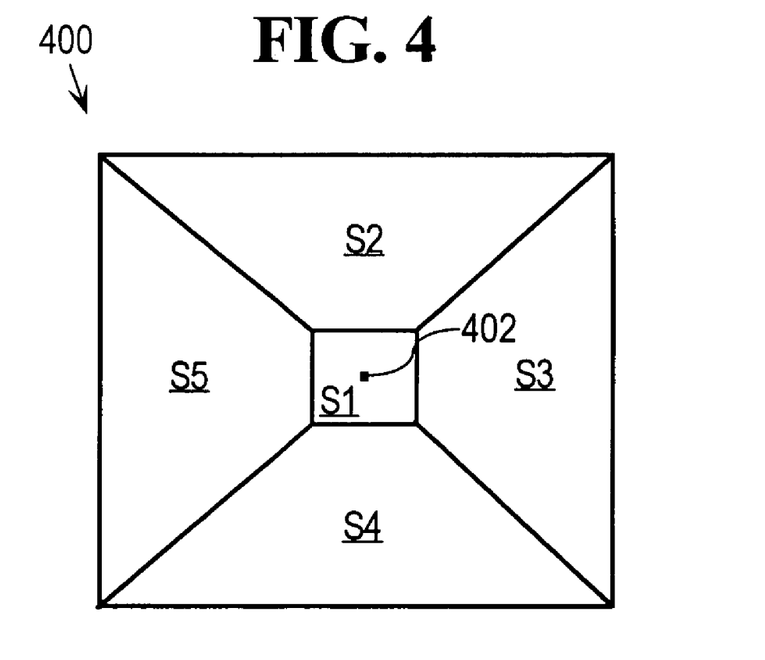
FIG. 4 is a block diagram depicts an image having a center of mass at a location.

FIG. 1 is a flow diagram 100 that depicts an approach for detecting near duplicate images according to one embodiment of the invention. In step 102, the center of mass of each image is determined and segments defined around the center of gravity as described in more detail hereinafter and as depicted in FIG. 4. In step 104, color histogram descriptor data is generated for each segment of each image. In step 106, texture histogram descriptor data is generated for each segment of each image. In step 108, image signature data is generated for each image based upon the color histogram descriptor data and the texture histogram descriptor data. In step 110, a determination is made whether the images are near duplicate images. As described in more detail hereinafter, this determination may be performed using either the color and texture histogram descriptor data or the image signature data. In implementations where the determination of whether images are near duplicate images is performed using the color and texture histogram descriptor data without the image signature data, then step 108 may not be performed. Additional details of the approach are described hereinafter.

The approach has been found to be effective in identifying near duplicate images because of the use of color and texture analysis to generate the image signatures. The approach is applicable to a wide variety of contexts and implementations and is not limited to any particular context or limitation. For example, the approach may be used in the search engine context to reduce the number of near duplicate images contained in search results. As another example, the approach may be used to reduce the number of near duplicate images stored in databases. As a further example, the approach may be employed to identify unauthorized copies of images where the unauthorized copies were modified in an attempt to avoid detection. The approach is also not limited to images per se and may be applied to video data, for example, video frames. The image signatures described herein may be used in combination with other information used to identify duplicate images. Image signatures may also be used to support high level functionality, for example, determining whether an image is a photo or graphic in an image search engine.

II. Center of Mass and Image Segments

According to one embodiment of the invention, a center of mass on luminance is determined for an image for which color and texture histogram descriptor data is to be generated as follows:

For an image, $$S = \Sigma_i \Sigma_j \text{lum}_{ij} \quad (1)$$

$$S_x = \Sigma_i \Sigma_j \text{lum}_{ij} \times i \quad (2)$$

$$S_y = \Sigma_i \Sigma_j \text{lum}_{ij} \times j \quad (3)$$

Figure 2A:
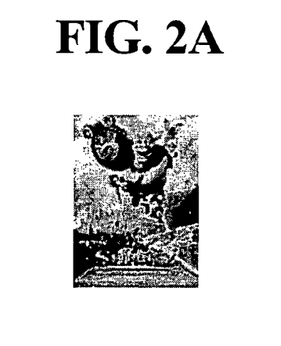
FIGS. 2A and 2B are images that are visually similar but that have different center of masses.
Figure 2B:
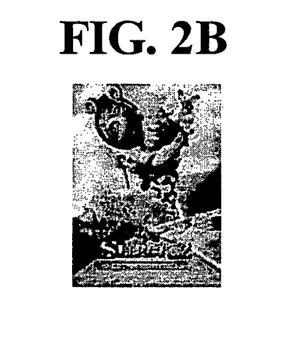
Figure 3A:
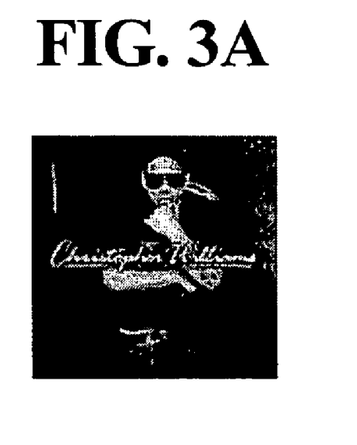
FIGS. 3A and 3B are two other example images that are visually similar but that have different center of masses.
Figure 3B:
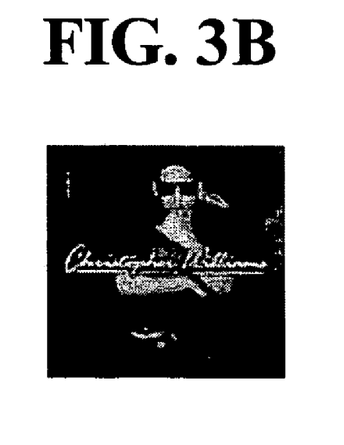

Where, $\text{lum}_{ij} = 0.299 \times R + 0.587 \times G + 0.114 \times B$ with (R, G, B) colors at pixel (i,j). Center of mass $(C_x, C_y)$ is then defined as $C_x = S_x/S$ and $C_y = S_y/S$ FIGS. 2A and 2B are two images that are visually similar but that have different center of masses. The image in FIG. 2A has a center of mass of (45, 60), while the image in FIG. 2B has a center of mass of (38, 51). As another example, FIGS. 3A and 3B are also images that are visually similar but that have different center of masses. The image in FIG. 3A has a center of mass of (65, 43), while the image in FIG. 3B has a center of mass of (56, 46).

Once the center of mass on luminance has been determined, the image is segmented based upon the location of the center of mass. FIG. 4 is a block diagram that depicts an image 400 having a center of mass at a location 402. A center segment S1 is defined by the center of mass of image 400. Four other segments are defined for image 400, including a top segment S2, a right segment S3, a bottom segment S4 and a left segment S5. The number, size and shape of segments may vary, from image to image, depending upon a particular implementation, and the approach is not limited to segments of any particular number, size or shape.

III. Color Histogram Descriptor Data

Figure 5:
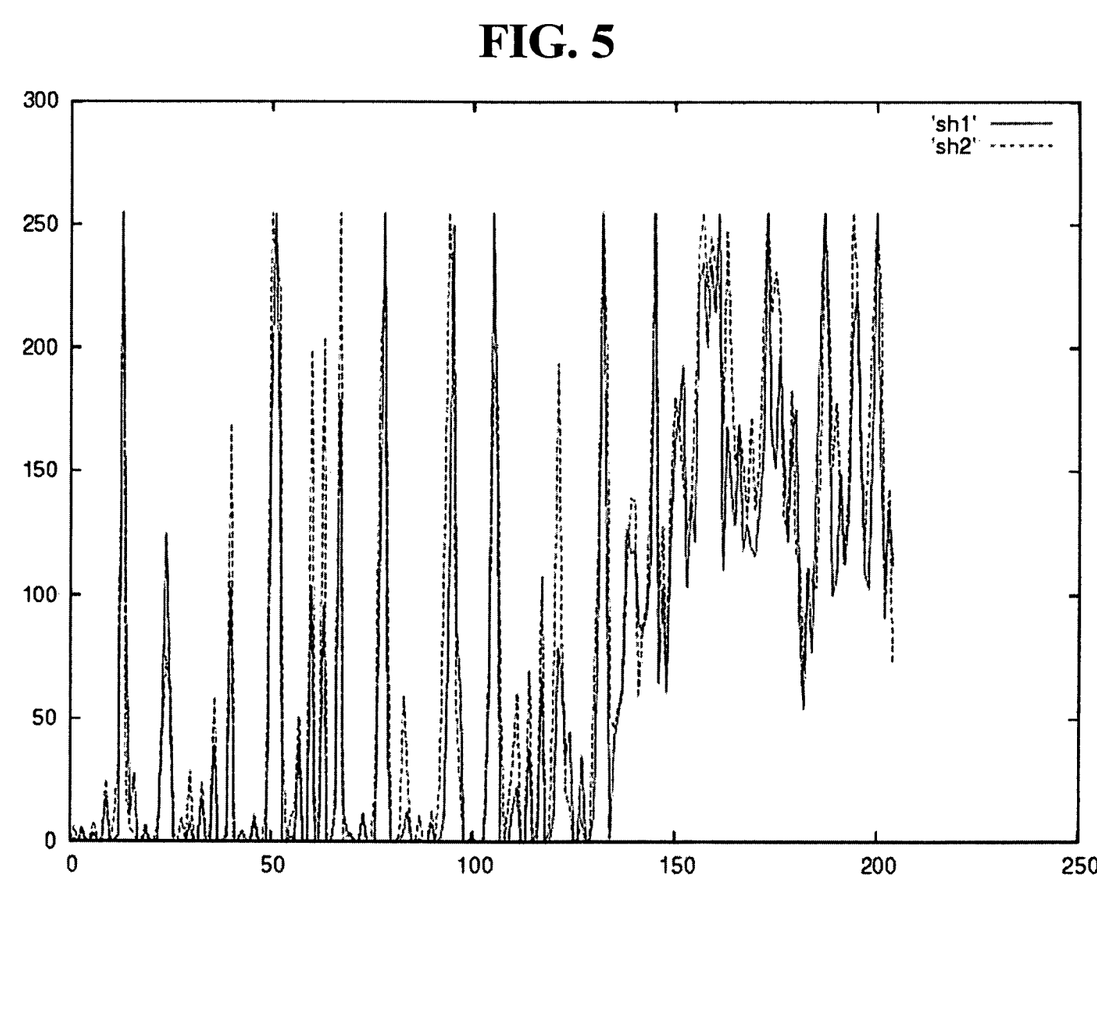
FIG. 5 is a color histogram of the image in FIGS. 2A and 2B.

According to one embodiment of the invention, color histogram descriptor data is generated for each segment in an image. Various color spaces, for example hue saturation value (HSV) or red, green blue (RGB), and quantization schemes may be employed, depending upon a particular implementation, and the approach described herein is not limited to any particular color space or quantization scheme. According to one embodiment of the invention, color histogram descriptor data is generated for each segment based upon a quantization scheme of twenty seven (27) colors in RGB space. It has been determined that a quantization scheme of 27 colors provides sufficient color representation while providing significant savings in computational cost over quantization schemes that use a larger number of colors. Thus, in this embodiment of the invention, the color histogram descriptor data for a particular segment indicates the number of occurrences within the particular segment of each of 27 colors. For an image divided into five segments, the color histogram descriptor data includes 27×5 or 135 values. The color histogram descriptor data may also be normalized. According to one embodiment of the invention, the color histogram descriptor data is normalized by dividing each of the values by the maximum value. The color histogram descriptor data for each segment may be separately normalized. FIG. 5 is a color histogram of the image in FIGS. 2A and 2B.

IV. Texture Histogram Descriptor Data

Figure 6:
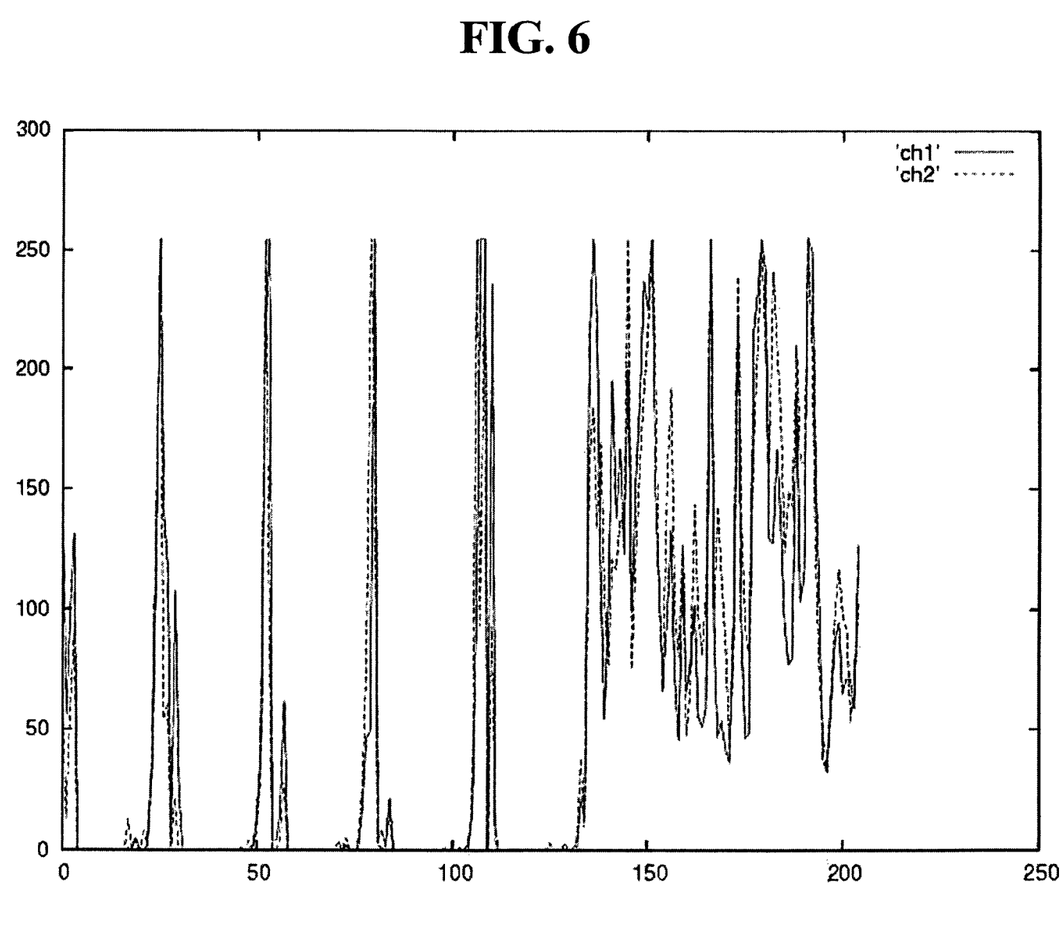
FIG. 6 is a color histogram of the image in FIGS. 3A and 3B.

According to one embodiment of the invention, texture histogram descriptor data is generated for each segment in an image. An image is first converted to a gray-scaled image. A gray-scaled image has data values of, for example, 0-255 for each pixel. A variety of well-known techniques may be used to generate the gray-scaled image data and the invention is not limited to any particular approach. For example, the gray-scaled image data may be generated from the color image data using digital image manipulation software application, such as Adobe Photoshop, available from Adobe Systems, Inc. of San Jose, Calif. Texture analysis is then performed on each segment of the gray-scaled image to determine the edge orientation at each pixel within a segment. According to one embodiment of the invention, this is performed using oriented Gaussian filtering and each edge orientation is quantized to fourteen (14) directions. Although any quantization scheme may be employed, it has been determined that a quantization scheme of 14 directions provides sufficient texture representation while providing significant savings in computations costs over quantization schemes that use a larger number of edge orientations. Thus, in this embodiment of the invention, the texture histogram descriptor data for a particular segment indicates the number of occurrences within the particular segment of each of 14 edge orientations. For an image divided into five segments, the texture histogram descriptor data includes 14×5 or 70 values. The texture histogram descriptor data may also be normalized. According to one embodiment of the invention, the texture histogram descriptor data is normalized by dividing each of the values by the maximum value. The texture histogram descriptor data for each segment may be separately normalized. FIG. 6 is a color histogram of the image in FIGS. 3A and 3B.

V. Image Signature Data Generation

Different types of image signature data may be generated, depending upon the requirements of a particular implementation. According to one embodiment of the invention, wavelet-based signature data is generated. According to this approach, the wavelet-based signature data includes X number of bits, with X/2 bits for color and X/2 bits for texture. Signature encoding of the color histogram descriptor data and texture histogram descriptor data is performed using a wavelet transform-based compression. According to one embodiment of the invention, a Haar transform with eight (8) average coefficients with uniform quantization is used to create either a 64 bit or 128 bit signature. Both the color and texture histograms are encoded to 32 or 64 bits for a total signature size of 64 or 128 bits.

According to another embodiment of the invention, vector quantization-based signature data is generated. According to this approach, a set of vector quantization code books is generated from random images. The code books contain representative vectors in color and texture space. The number of code books used may vary depending upon a particular implementation and the invention is not limited to any particular number of code books. According to one embodiment of the invention, three random 64 k images are processed to create three code books for color and three code books for texture.

To generate a vector quantization-based signature for a particular image, first the color and texture histogram descriptor data for the particular image are matched to color and texture histogram descriptor data contained in the code books. For example, the 135 color histogram values are matched to color histogram values contained in each of the color code books. Similarly, the 70 texture histogram values are matched to texture histogram values contained in each of the texture code books. A vector quantization-based signature for the particular image is then generated based upon index values for the matching color and texture histogram data in the code books. According to one embodiment of the invention, the vector quantization-based signature includes the index values for each color and texture code book and other data. The other data may indicate, for example, the type class of the particular image, i.e., graphic or picture, and the texture class of the particular image. For example, suppose that three images are used to create the code books, providing three color code books and three texture code books. In this situation, a 64 bit vector quantization-based signature may include 10 bits for each of the six matching code book index values (60 bits) and four bits for the other data.

VI. Determining Whether Images are Near Duplicate Images

Various approaches may be used to determine whether images are near duplicate images. For example, these approaches may use the color and texture histogram descriptor data for images or the image signature data. According to one embodiment of the invention, the color and texture histogram descriptor data is used to determine whether two images are near duplicate images. Two images may be considered to be near duplicate images if their corresponding color and texture histogram descriptor data satisfy a threshold level of similarity. Alternatively, LSH-based similarity may be used.

According to another embodiment of the invention, image signature data is used to determine whether two images are near duplicate images. For implementations where wavelet-based signature data is generated, the wavelet-based signature data may be compared using a Hamming distance. For implementations where vector quantization-based signature data is generated, the vector quantization-based signature data for images may be directly compared to determine whether there are exact matches on any parts of the vector quantization-based signature data.

VII. Implementation Mechanisms

The approach described herein for detecting near duplicate images may be used in a variety of contexts and applications. For example, the approach may be used to "de-duplicate" a database of images. In this example, a process may be used to generate color and texture histogram descriptor data and image signature data for each image in the database and then store this information in an index. The information in the index may then be used to identify near duplicate images. A decision can then be made on which of the near duplicate images should be deleted from the database.

As another example, in the search context, the approach may be used to eliminate near duplicate images in search results. In this example, when a search query is processed and search results are generated, images contained in the search results may be evaluated as described herein to identify near duplicate images. A decision can then be made about which of the near duplicate images are to be removed from the search results. The approach may be applied to many other contexts and implementations and is not limited to these example contexts and implementations.

The approach described herein for detecting near duplicate images may be implemented on any type of computing architecture or platform and in any type of process. As described herein, the approach may be implemented as part of a database management process or in association with a search engine platform. For purposes of explanation, an example computing architecture is described hereinafter.

Figure 7:
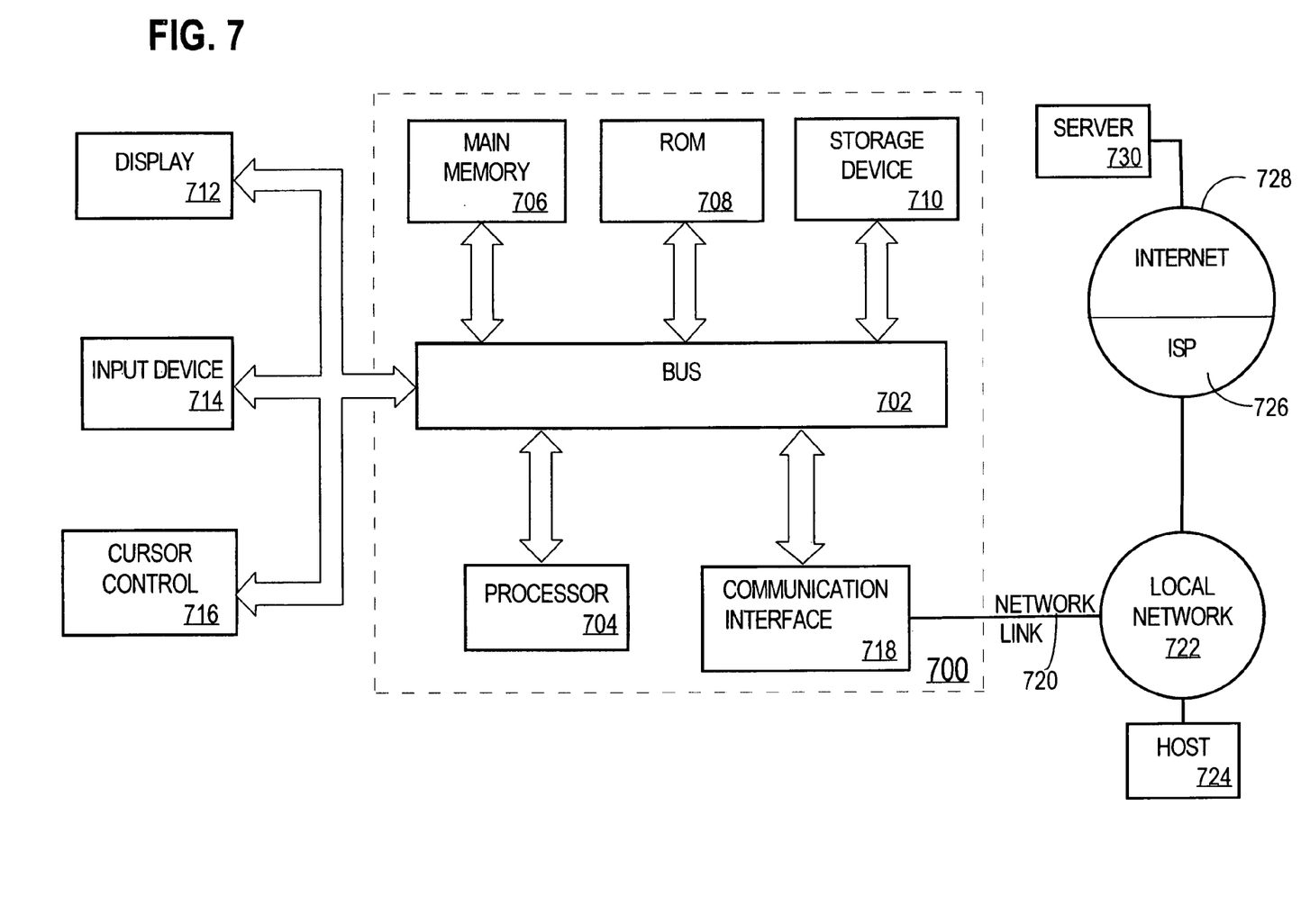
FIG. 7 is a block diagram that illustrates a computer system upon which an embodiment of the invention may be implemented.

FIG. 7 is a block diagram that illustrates an example computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing image data, the computer-implemented method comprising:
   generating, based upon first color image data, first color histogram descriptor data that indicates a number of occurrences in the first color image data of each of a plurality of colors;
   generating first gray-scaled image data based upon the first color image data;
   generating, based upon the first gray-scaled image data, first texture histogram descriptor data that indicates a number of occurrences in the first gray-scaled image data of each of a plurality of edge orientations;
   generating, based upon second color image data, second color histogram descriptor data that indicates a number of occurrences in the second color image data of each of a plurality of colors;
   generating second gray-scaled image data based upon the second color image data;
   generating, based upon the second gray-scaled image data, second texture histogram descriptor data that indicates a number of occurrences in the second gray-scaled image data of each of a plurality of edge orientations; and
   determining whether the first color image data is a near duplicate of the second color image data by
      comparing the first color histogram descriptor data to the second color histogram descriptor data, and
      comparing the first texture histogram descriptor data to the second texture histogram descriptor data;
   wherein one or more of the steps are performed using one or more processors.

2. The computer-implemented method as recited in claim 1, wherein the first and second color histogram descriptor data are quantized in RGB space and normalized.

3. The computer-implemented method as recited in claim 1, wherein the first and second texture histogram descriptor data are quantized to a subset of possible directions and normalized.

4. The computer-implemented method as recited in claim 1, wherein the determining whether the first color image data is a near duplicate of the second color image data includes determining an L1 similarity measure between the first and second color histogram descriptor data and determining an L1 similarity measure between the first and second texture histogram descriptor data.

5. The computer-implemented method as recited in claim 1, wherein the determining whether the first color image data is a near duplicate of the second color image data includes determining an LSH similarity measure between the first and second color histogram descriptor data and determining an LSH similarity measure between the first and second texture histogram descriptor data.

6. The computer-implemented method as recited in claim 1, wherein:
the computer-implemented method further comprises using the one or more processors to perform the steps of:
determining a first center of mass on luminance of the first color image data,
dividing the first color image data into a first plurality of segments based upon the first center of mass, and
determining a second center of mass on luminance of the second color image data
dividing the second color image data into a second plurality of segments based upon the second center of mass, and
the generating the first color histogram descriptor data includes generating first color histogram descriptor data for each of the first plurality of segments;
the generating the first texture histogram descriptor data includes generating first texture histogram descriptor data for each of the first plurality of segments;
the generating the second color histogram descriptor data includes generating second color histogram descriptor data for each of the second plurality of segments; and
the generating the second texture histogram descriptor data includes generating second texture histogram descriptor data for each of the second plurality of segments.

7. A computer-implemented method for processing image data, the computer-implemented method comprising:
generating, based upon first color image data, first color histogram descriptor data that indicates a number of occurrences in the first color image data of each of a plurality of colors;
generating first gray-scaled image data based upon the first color image data;
generating, based upon the first gray-scaled image data, first texture histogram descriptor data that indicates a number of occurrences in the first gray-scaled image data of each of a plurality of edge orientations;
generating, based upon second color image data, second color histogram descriptor data that indicates a number of occurrences in the second color image data of each of a plurality of colors;
generating second gray-scaled image data based upon the second color image data;
generating, based upon the second gray-scaled image data, second texture histogram descriptor data that indicates a number of occurrences in the second gray-scaled image data of each of a plurality of edge orientations;
generating first signature data based upon the first color histogram data and the first texture histogram data;
generating second signature data based upon the second color histogram data and the second texture histogram data;
determining whether the first color image data is a near duplicate of the second color image data by comparing the first signature data to the second signature data;
wherein one or more of the steps are performed using one or more processors.

8. The computer-implemented method as recited in claim 7, wherein:
the generating first signature data based upon the first color histogram data and the first texture histogram data includes generating first wavelet-based signature data by processing the first color histogram data and the first texture histogram data using a wavelet transform,
the generating second signature data based upon the second color histogram data and the second texture histogram data includes generating second wavelet-based signature data by processing the second color histogram data and the second texture histogram data using the wavelet transform, and
the comparing the first signature data to the second signature data includes comparing the first wavelet-based signature data to the second wavelet-based signature data.

9. The computer-implemented method as recited in claim 8, wherein the wavelet transform is a Haar transform with uniform quantization.

10. The computer-implemented method as recited in claim 8, wherein the comparing the first wavelet-based signature data to the second wavelet-based signature data includes determining a Hamming distance between the first wavelet-based signature data and the second wavelet-based signature data.

11. The computer-implemented method as recited in claim 7, wherein the first signature data is generated by processing the first color histogram data and the first texture histogram data using vector quantization and the second signature data is generated by processing the second color histogram data and the second texture histogram data using the vector quantization.

12. The computer-implemented method as recited in claim 11, wherein the comparing the first signature data to the second signature data includes identifying any exact matches of one or more portions of the first signature data with one or more portions of the second signature data.

13. A non-transitory computer-readable storage medium for processing image data, the non-transitory computer-readable medium storing instructions which, when processed by one or more processors, cause:
generating, based upon first color image data, first color histogram descriptor data that indicates a number of occurrences in the first color image data of each of a plurality of colors;
generating first gray-scaled image data based upon the first color image data;
generating, based upon the first gray-scaled image data, first texture histogram descriptor data that indicates a number of occurrences in the first gray-scaled image data of each of a plurality of edge orientations;
generating, based upon second color image data, second color histogram descriptor data that indicates a number of occurrences in the second color image data of each of a plurality of colors;
generating second gray-scaled image data based upon the second color image data;
generating, based upon the second gray-scaled image data, second texture histogram descriptor data that indicates a number of occurrences in the second gray-scaled image data of each of a plurality of edge orientations; and determining whether the first color image data is a near duplicate of the second color image data by comparing the first color histogram descriptor data to the second color histogram descriptor data, and comparing the first texture histogram descriptor data to the second texture histogram descriptor data.

14. The non-transitory computer-readable storage medium as recited in claim 13, wherein the first and second color histogram descriptor data are quantized in RGB space and normalized.

15. The non-transitory computer-readable storage medium as recited in claim 13, wherein the first and second texture histogram descriptor data are quantized to a subset of possible directions and normalized.

16. The non-transitory computer-readable storage medium as recited in claim 13, wherein the determining whether the first color image data is a near duplicate of the second color image data includes determining an L1 similarity measure between the first and second color histogram descriptor data and determining an L1 similarity measure between the first and second texture histogram descriptor data.

17. The non-transitory computer-readable storage medium as recited in claim 13, wherein the determining whether the first color image data is a near duplicate of the second color image data includes determining an LSH similarity measure between the first and second color histogram descriptor data and determining an LSH similarity measure between the first and second texture histogram descriptor data.

18. The non-transitory computer-readable storage medium as recited in claim 13, wherein:

the computer-readable medium further comprises additional instructions which, when processed by the one or more processors, cause:

determining a first center of mass on luminance of the first color image data, dividing the first color image data into a first plurality of segments based upon the first center of mass, and determining a second center of mass on luminance of the second color image data dividing the second color image data into a second plurality of segments based upon the second center of mass, and the generating the first color histogram descriptor data includes generating first color histogram descriptor data for each of the first plurality of segments;

the generating the first texture histogram descriptor data includes generating first texture histogram descriptor data for each of the first plurality of segments;

the generating the second color histogram descriptor data includes generating second color histogram descriptor data for each of the second plurality of segments; and the generating the second texture histogram descriptor data includes generating second texture histogram descriptor data for each of the second plurality of segments.

19. A non-transitory computer-readable storage medium for processing image data, the non-transitory computer-readable medium storing instructions which, when processed by one or more processors, cause:

generating, based upon first color image data, first color histogram descriptor data that indicates a number of occurrences in the first color image data of each of a plurality of colors;

generating first gray-scaled image data based upon the first color image data;

generating, based upon the first gray-scaled image data, first texture histogram descriptor data that indicates a number of occurrences in the first gray-scaled image data of each of a plurality of edge orientations;

generating, based upon second color image data, second color histogram descriptor data that indicates a number of occurrences in the second color image data of each of a plurality of colors;

generating second gray-scaled image data based upon the second color image data;

generating, based upon the second gray-scaled image data, second texture histogram descriptor data that indicates a number of occurrences in the second gray-scaled image data of each of a plurality of edge orientations;

generating first signature data based upon the first color histogram data and the first texture histogram data;

generating second signature data based upon the second color histogram data and the second texture histogram data;

determining whether the first color image data is a near duplicate of the second color image data by comparing the first signature data to the second signature data.

20. The non-transitory computer-readable storage medium as recited in claim 19, wherein:

the generating first signature data based upon the first color histogram data and the first texture histogram data includes generating first wavelet-based signature data by processing the first color histogram data and the first texture histogram data using a wavelet transform, the generating second signature data based upon the second color histogram data and the second texture histogram data includes generating second wavelet-based signature data by processing the second color histogram data and the second texture histogram data using the wavelet transform, and the comparing the first signature data to the second signature data includes comparing the first wavelet-based signature data to the second wavelet-based signature data.

21. The non-transitory computer-readable storage medium as recited in claim 20, wherein the wavelet transform is a Haar transform with uniform quantization.

22. The non-transitory computer-readable storage medium as recited in claim 20, wherein the comparing the first wavelet-based signature data to the second wavelet-based signature data includes determining a Hamming distance between the first wavelet-based signature data and the second wavelet-based signature data.

23. The non-transitory computer-readable storage medium as recited in claim 19, wherein the first signature data is generated by processing the first color histogram data and the first texture histogram data using vector quantization and the second signature data is generated by processing the second color histogram data and the second texture histogram data using the vector quantization.

24. The non-transitory computer-readable storage medium as recited in claim 23, wherein the comparing the first signature data to the second signature data includes identifying any exact matches of one or more portions of the first signature data with one or more portions of the second signature data.

25. An apparatus for processing image data, the apparatus comprising a memory storing instructions which, when processed by one or more processors, cause:

generating, based upon first color image data, first color histogram descriptor data that indicates a number of occurrences in the first color image data of each of a plurality of colors;

generating first gray-scaled image data based upon the first color image data;

generating, based upon the first gray-scaled image data, first texture histogram descriptor data that indicates a number of occurrences in the first gray-scaled image data of each of a plurality of edge orientations;

generating, based upon second color image data, second color histogram descriptor data that indicates a number of occurrences in the second color image data of each of a plurality of colors;

generating second gray-scaled image data based upon the second color image data;

generating, based upon the second gray-scaled image data, second texture histogram descriptor data that indicates a number of occurrences in the second gray-scaled image data of each of a plurality of edge orientations; and determining whether the first color image data is a near duplicate of the second color image data by
comparing the first color histogram descriptor data to the second color histogram descriptor data, and
comparing the first texture histogram descriptor data to the second texture histogram descriptor data.

26. The apparatus as recited in claim 25, wherein the first and second color histogram descriptor data are quantized in RGB space and normalized.

27. The apparatus as recited in claim 25, wherein the first and second texture histogram descriptor data are quantized to a subset of possible directions and normalized.

28. The apparatus as recited in claim 25, wherein the determining whether the first color image data is a near duplicate of the second color image data includes determining an L1 similarity measure between the first and second color histogram descriptor data and determining an L1 similarity measure between the first and second texture histogram descriptor data.

29. The apparatus as recited in claim 25, wherein the determining whether the first color image data is a near duplicate of the second color image data includes determining an LSH similarity measure between the first and second color histogram descriptor data and determining an LSH similarity measure between the first and second texture histogram descriptor data.

30. The apparatus as recited in claim 25, wherein:
the memory further stores additional instructions which, when processed by the one or more processors, cause:
determining a first center of mass on luminance of the first color image data,
dividing the first color image data into a first plurality of segments based upon the first center of mass, and
determining a second center of mass on luminance of the second color image data
dividing the second color image data into a second plurality of segments based upon the second center of mass, and
the generating the first color histogram descriptor data includes generating first color histogram descriptor data for each of the first plurality of segments;
the generating the first texture histogram descriptor data includes generating first texture histogram descriptor data for each of the first plurality of segments;
the generating the second color histogram descriptor data includes generating second color histogram descriptor data for each of the second plurality of segments; and
the generating the second texture histogram descriptor data includes generating second texture histogram descriptor data for each of the second plurality of segments.

31. An apparatus for processing image data, the apparatus comprising a memory storing instructions which, when processed by one or more processors, cause:
generating, based upon first color image data, first color histogram descriptor data that indicates a number of occurrences in the first color image data of each of a plurality of colors;
generating first gray-scaled image data based upon the first color image data;
generating, based upon the first gray-scaled image data, first texture histogram descriptor data that indicates a number of occurrences in the first gray-scaled image data of each of a plurality of edge orientations;
generating, based upon second color image data, second color histogram descriptor data that indicates a number of occurrences in the second color image data of each of a plurality of colors;
generating second gray-scaled image data based upon the second color image data;
generating, based upon the second gray-scaled image data, second texture histogram descriptor data that indicates a number of occurrences in the second gray-scaled image data of each of a plurality of edge orientations;
generating first signature data based upon the first color histogram data and the first texture histogram data;
generating second signature data based upon the second color histogram data and the second texture histogram data;
determining whether the first color image data is a near duplicate of the second color image data by comparing the first signature data to the second signature data.

32. The apparatus as recited in claim 31, wherein:
the generating first signature data based upon the first color histogram data and the first texture histogram data includes generating first wavelet-based signature data by processing the first color histogram data and the first texture histogram data using a wavelet transform,
the generating second signature data based upon the second color histogram data and the second texture histogram data includes generating second wavelet-based signature data by processing the second color histogram data and the second texture histogram data using the wavelet transform, and
the comparing the first signature data to the second signature data includes comparing the first wavelet-based signature data to the second wavelet-based signature data.

33. The apparatus as recited in claim 32, wherein the wavelet transform is a Haar transform with uniform quantization.

34. The apparatus as recited in claim 32, wherein the comparing the first wavelet-based signature data to the second wavelet-based signature data includes determining a Hamming distance between the first wavelet-based signature data and the second wavelet-based signature data.

35. The apparatus as recited in claim 31, wherein the first signature data is generated by processing the first color histogram data and the first texture histogram data using vector quantization and the second signature data is generated by processing the second color histogram data and the second texture histogram data using the vector quantization.

36. The apparatus as recited in claim 35, wherein the comparing the first signature data to the second signature data includes identifying any exact matches of one or more portions of the first signature data with one or more portions of the second signature data.

* * * * *